United States Patent Office 2,711,962
Patented June 28, 1955

2,711,962

STABILIZED FORAGE PRODUCTS

Emanuel M. Bickoff, Berkeley, Calif., assignor to the United States of America as represented by the Secretary of Agriculture No Drawing. Application August 11, 1954,
Serial No. 449,280

8 Claims. (Cl. 99—8)

(Granted under Title 35, U. S. Code (1952), sec. 266)

A non-exclusive, irrevocable, royalty-free license in the invention herein described, for all governmental purposes, throughout the world, with the power to grant sublicenses for such purposes is hereby granted to the Government of the United States of America.

This invention relates to the preservation of forage crops. In particular, the invention relates to the treatment of dried forage crops, such as dried grasses, legumes, and especially alfalfa, so as to stabilize the carotene content of the forage material.

The problem with which this invention is concerned may be illustrated by the following reference to alfalfa:

Alfalfa is widely used as a feed and as an ingredient in mixed feeds for chickens, cattle, and other livestock. It is especially valuable for such purposes because of its high carotene content. Generally, alfalfa in mixed feeds, particularly poultry feeds, is used in the form of a meal prepared by harvesting fresh alfalfa, drying it and comminuting the dried alfalfa to a meal. In this form the alfalfa will not spoil and can be readily bagged for storage or shipping. One problem that has beset the industry, however, is that upon storage certain chemical changes take place whereby the carotene content is rapidly decreased. For example if the meal is stored at 80° F., it loses about two-thirds of its carotene content in 24 weeks. Of course, at higher temperatures such as prevail in barns or warehouses in summer, the rate of carotene loss is greatly accelerated.

It has now been found that the carotene content of alfalfa or other forage crop is stabilized if certain quinoline derivatives are incorporated therewith. The quinoline derivatives which may be used in accordance with this invention and which may be termed halogenated 2,2,4-trialkyl-1,2-dihydroquinolines, are represented by the following formula:

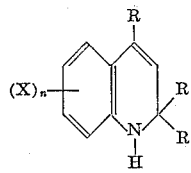

wherein the R's represent the same or dissimilar alkyl radicals; X represents a halogen; and $n$ represents an integer from 1 to 4. Thus for example, the R's may be methyl, ethyl, propyl, isopropyl, etc.; the X may be chlorine, bromine, or iodine; and $n$ may be 1, 2, 3, or 4. It is evident that where there is more than one halogen atom on the quinoline nucleus, they need not all be the same. Thus one may be chlorine, the other bromine, and so forth.

Only a small amount of the above-described agents are required to obtain the stabilizing effect, i. e., from about 0.01% to about 0.5% based on the dry weight of forage material. Obviously the higher the proportion of stabilizing agent the greater will be the stabilizing effect.

The agents are generally applied to the forage in the form of a solution or emulsion so that the small proportion of this material can be applied uniformly. Suitable solvents are, for example, ethylene glycol monoethyl either, deodorized kerosene, ethanol, n-propanol, isopropanol, n-butanol, propylene glycol, and glyceride oils such as cottonseed oil, soybean oil, coconut oil, corn oil, peanut oil, sesame oil, animal tallows and greases, etc. Also useful as solvents are the esters of short-chain alkanols, such as methanol, ethanol, propyl, or butyl alcohols, with high-molecular weight fatty acids such as lauric, palmitic, oleic or with mixtures of fatty acids obtained from animal or vegetable oils or fats. Glyceride oils, especially crude vegetable oils are preferred solvents as they reduce dustiness of the dehydrated forage and further in some cases, alfalfa, for example, they give it an enhanced green color. In using a glyceride oil as the solvent it is preferred to first dissolve the stabilizing agent in a small amount of acetone and then mix this solution with the oil. In this way solution of the stabilizing agent is more readily attained. Generally, the beneficial effect of the glyceride oil is attained when applied in a proportion of from about 0.5% to about 5%, based on the dry weight of forage.

In preparing the emulsion form of the stabilizing agent, a solution of the stabilizing agent in any of the aforementioned solvents is first prepared and a small proportion of an emulsifying agent is dissolved therein. The resulting solution is then agitated with a large volume of water thereby to produce the emulsion. Many different emulsifying agents can be used, for example, sorbitan mono-oleate, the polyoxyalkylene ether of sorbitan monooleate, a polyglyceride of a Glyptal resin, and so forth. The concentration of the stabilizing agent in the solution or emulsion is not critical, generally for convenience a 5 to 10% solution is used.

The most convenient method of applying the solution or emulsion of the stabilizing agent is to spray it onto the dried forage. To secure uniform impregnation, the forage is preferably agitated by suitable means during the spraying to expose all surfaces thereof to the spray. Thus one practical method involves tumbling the forage about in a rotating drum while the solution is sprayed into the interior of the drum. Another method involves allowing the forage to fall through a tower equipped with baffles while it is sprayed with the solution on its passage through the tower. It is evident that any other apparatus or method which is adapted to obtain uniform impregnation can be used. The solution or emulsion of the stabilizing agent can be applied to the green forage, to the finished dehydrated forage, or it can be applied to the forage at various stages in its processing. Thus for example, the solution can be applied to the forage after it is dehydrated but before it is comminuted to form a meal. Further, the solution can be applied while the dehydrated forage is being milled to produce the meal.

The forage material containing the incorporated halogenated 2,2,4-trialkyl-1,2-dihydroquinoline can be mixed with various ingredients to form animal feeds in which the forage component is stabilized against carotene loss. Thus for example the stabilized forage may be incorporated with cereal materials such as corn, wheat, oats, barley, vitamins or vitamin concentrates, soybean meal, fish meal, oils, essential mineral salts and so on, all as well known in the art of compounding animal feeds.

The following example discloses steps and conditions within the scope of this invention. It is understood that this example is furnished only by way of illustration and not limitation.

*Example*

A 200-gram sample of dehydrated alfalfa meal was placed in a rotatable cylinder provided with baffles. While rotating the cylinder to cause thorough agitation of the meal, the meal was sprayed with 4 ml. of an ethylene glycol monoethyl ether solution containing 0.25 gram of 7-chloro-2,2,4-trimethyl-1,2-dihydroquinoline. The treated meal therefore contained 0.125% of the stabilizing agent. The agent used in this experiment had the formula:

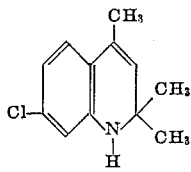

Samples of the treated meal and samples of the untreated meal (control) were stored in open vessels at 65° C. and at 25° C. The carotene content of each sample was determined after storage for 14 days at 65° C. and after 6 months at 25° C. The carotene contents after storage were compared with the original carotene content of the meal to determine the proportion of carotene remaining in the meal after storage. The following results were obtained:

| Antioxidant | Proportion of original carotene remaining in meal after storage at 65° C. for 14 days, percent | Proportion original carotene remaining in meal after storage at 25° C. for 6 mo., percent |
| --- | --- | --- |
| None used (control) | 22 | 32 |
| 0.125% of 7-chloro-2,2,4-trimethyl-1,2-dihydroquinoline | 50 | 68.3 |

It has been established that the above-described halogenated 2,2,4-trialkyl-1,2-dihydroquinoline derivatives stabilize the carotene content of forage crops. The mechanism of the stabilization is not known although my researches indicate that the agents act as negative catalysts in preventing oxidation of the carotene. The powerful stabilizing effect of these compounds in this respect is surprising because many compounds of known antioxidative value, including compounds containing the quinoline nucleus, have little, if any, effect on the stabilization of carotene in a natural substrate such as alfalfa. This fact is shown by the following experiments:

A series of 200-gram samples of dehydrated alfalfa meal were each treated with a solution of a known antioxidant using the spray technique set forth in the above example. In each case, the solution contained 0.25 gram of the antioxidant and was made up to a volume of 4 ml. with ethylene glycol monoethyl ether. In each case the treated meal contained 0.125% of the antioxidant. An untreated sample (control) and the treated samples were stored at 65° C. in open vessels and then analyzed for carotene content. The carotene contents after storage were compared with the original carotene content of the meal to determine the proportion of original carotene remaining in the meal after storage. The following results were obtained:

| Expt. No. | Antioxidant | Proportion of original carotene remaining in meal after storage at 65° C. for 14 days, percent |
| --- | --- | --- |
| 1 | none used (control) | 22 |
| 2 | nordihydroguaiaretic acid | 24 |
| 3 | thiodipropionic acid | 24 |
| 4 | lauryl thiodipropionate | 25 |
| 5 | ethyl gallate | 28 |
| 6 | propyl gallate | 26 |
| 7 | catechol | 25 |
| 8 | pyrogallol | 29 |
| 9 | hydroquinone monomethyl ether | 25 |
| 10 | p-tertiary butyl catechol | 31 |
| 11 | diphenylamine | 34 |
| 12 | ethyl hydrocaffeate | 26 |
| 13 | 2,4-dimethyl-6-tertiary-butyl phenol | 26 |
| 14 | quinoline | 24 |
| 15 | 8-aminoquinoline | 20 |
| 16 | 4,8-dimethyl-2-hydroxyquinoline | 22 |
| 17 | 8-hydroxyquinoline | 22 |
| 18 | 5,7-dicholoro-8-hydroxyquinoline | 4 |
| 19 | isoquinoline | 24 |
| 20 | 6-methoxyquinoline | 27 |
| 21 | 6-phenylquinoline | 27 |
| 22 | 6-ethoxy-2,4-dimethylquinoline | 27 |
| 23 | 2,6-dimethylquinoline | 28 |
| 24 | 2-hydroxy-4-methylquinoline | 28 |
| 25 | 3-aminoquinoline | 28 |
| 26 | decahydroquinoline | 28 |

Having thus defined my invention, I claim:

1. The process of stabilizing a forage crop which comprises incorporating therewith a halogenated 2,2,4-trialkyl-1,2-dihydroquinoline.

2. The process of stabilizing a forage crop which comprises incorporating therewith 7-chloro-2,2,4-trimethyl-1,2-dihydroquinoline.

3. The process of claim 1 wherein the forage crop is alfalfa.

4. The process of claim 2 wherein the forage crop is alfalfa.

5. A stabilized forage product comprising a forage crop having incorporated therewith a halogenated 2,2,4-trialkyl-1,2-dihydroquinoline.

6. A stabilized forage product comprising a forage crop having incorporated therewith 7-chloro-2,2,4-trimethyl-1,2-dihydroquinoline.

7. The product of claim 5 wherein the forage crop is alfalfa.

8. The product of claim 6 wherein the forage crop is alfalfa.

No references cited.